(12) United States Patent
Lindsey et al.

(10) Patent No.: US 7,633,262 B2
(45) Date of Patent: Dec. 15, 2009

(54) POWER SUPPLY FOR UNDERGROUND AND PAD MOUNTED POWER DISTRIBUTION SYSTEMS

(75) Inventors: Keith E. Lindsey, La Canada, CA (US); Dusan Striez, Rancho Cucamonga, CA (US); James L. Landes, Farmersville, TX (US)

(73) Assignee: Lindsey Manufacturing Company, Azusa, CA (US)

( * ) Notice: Subject to any disclaimer, the term of this patent is extended or adjusted under 35 U.S.C. 154(b) by 289 days.

(21) Appl. No.: 11/078,787

(22) Filed: Mar. 11, 2005

(65) Prior Publication Data
US 2006/0202664 A1    Sep. 14, 2006

(51) Int. Cl.
H02J 3/00 (2006.01)
H02M 5/293 (2006.01)
H02H 7/00 (2006.01)
H01F 30/12 (2006.01)
H02J 7/00 (2006.01)

(52) U.S. Cl. ............................ 320/108; 307/17; 363/37; 363/51; 336/5

(58) Field of Classification Search .................. 320/108, 320/137, 152, 153, DIG. 30; 307/7, 17, 34, 307/35, 46, 52, 112; 324/127; 323/358; 336/12, 90, 182, 118, 119, 175, DIG. 2, 5; 363/37, 51
See application file for complete search history.

(56) References Cited

U.S. PATENT DOCUMENTS

| | | | | | |
|---|---|---|---|---|---|
| 2,372,600 | A | * | 3/1945 | Newman | 323/209 |
| 3,210,750 | A | * | 10/1965 | Leonard | 340/650 |
| 3,335,324 | A | * | 8/1967 | Buckeridge | 361/48 |
| 4,002,920 | A | * | 1/1977 | Jansen | 307/17 |
| 4,324,987 | A | * | 4/1982 | Sullivan et al. | 307/35 |
| 5,051,687 | A | * | 9/1991 | So | 323/357 |
| 5,301,096 | A | * | 4/1994 | Klontz et al. | 363/37 |
| 5,303,160 | A | * | 4/1994 | Winter et al. | 700/292 |
| 5,610,508 | A | * | 3/1997 | Kammiller | 323/358 |
| 6,664,762 | B2 | * | 12/2003 | Kutkut | 320/116 |
| 2003/0175566 | A1 | * | 9/2003 | Fisher et al. | 429/22 |

* cited by examiner

*Primary Examiner*—Edward Tso
*Assistant Examiner*—M'Baye Diao
(74) *Attorney, Agent, or Firm*—Christie, Parker & Hale, LLP.

(57) ABSTRACT

A power supply generated through a set of current transformers is disclosed. The current transformers may be removably attached to a primary power line such as a high voltage power line. The power supply may be used to power a device or charge a battery for a device that requires a low voltage input. The power supply may be used in underground vaults and pad mounted chambers that contain high voltage power lines. The power supply may generate a low voltage direct current output that is not available in the vicinity of high voltage power lines in an underground vault or pad mounted chamber.

24 Claims, 5 Drawing Sheets

POWER SUPPLY FOR UNDERGROUND AND PAD MOUNTED POWER DISTRIBUTION SYSTEMS

FIELD OF INVENTION

Embodiments of the invention relate to power supplies. The present invention relates to power supplies and more particularly to a power supply for underground and pad mounted power distribution systems.

BACKGROUND OF THE INVENTION

Electrical energy plays a central role in industrialized societies. The reliability of electric power systems is a critical factor in the planning, design and operation of power distribution systems. To ensure reliability, automated, real-time control of the system is desirable to allow for rapid response to the actual demand of electricity and any unforeseen contingencies such as equipment outages.

Modernized power distribution networks typically utilize energy control centers to monitor and regulate network operation. Although these centers have greatly advanced in technology, their basic control objectives of economy and security remain the same. The economic goal is to minimize the cost of supplying the electrical demand. The security goal is directed to the minimum requirements for reliability and quality of service. Electric utilities desire measurements of line voltage and current to allow for automated customer billing, load and reliability monitoring, and for real time control of the system.

The power distribution industry is increasingly relying on automated systems for providing real time control over the power distribution system. Remote monitoring and switching equipment is increasingly being relied on to monitor and control the power distribution system. Many segments of the power distribution system are underground such as underground vaults or chambers. Some segments of the power distribution system are accessed in above ground compartments or 'pad mounted' systems.

The power distribution system is composed of many high voltage segments that deliver electricity to local homes and businesses. Monitoring and controlling these high voltage segments of the system in underground vaults or pad mounted compartments poses the problem of finding a lower voltage power supply for the switching and monitoring equipment. The switches and monitoring equipment typically run on low voltage direct current power supplies. This type of power supply is not typically available in the underground vaults or pad mounted compartments where the high voltage lines run. A standard transformer to convert the high voltage into a lower voltage for this equipment is large, expensive and time consuming to install, requiring modification of the existing high voltage lines and possibly of the underground vault or pad mounted compartment.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

DETAILED DESCRIPTION OF THE INVENTION

Figure 1:
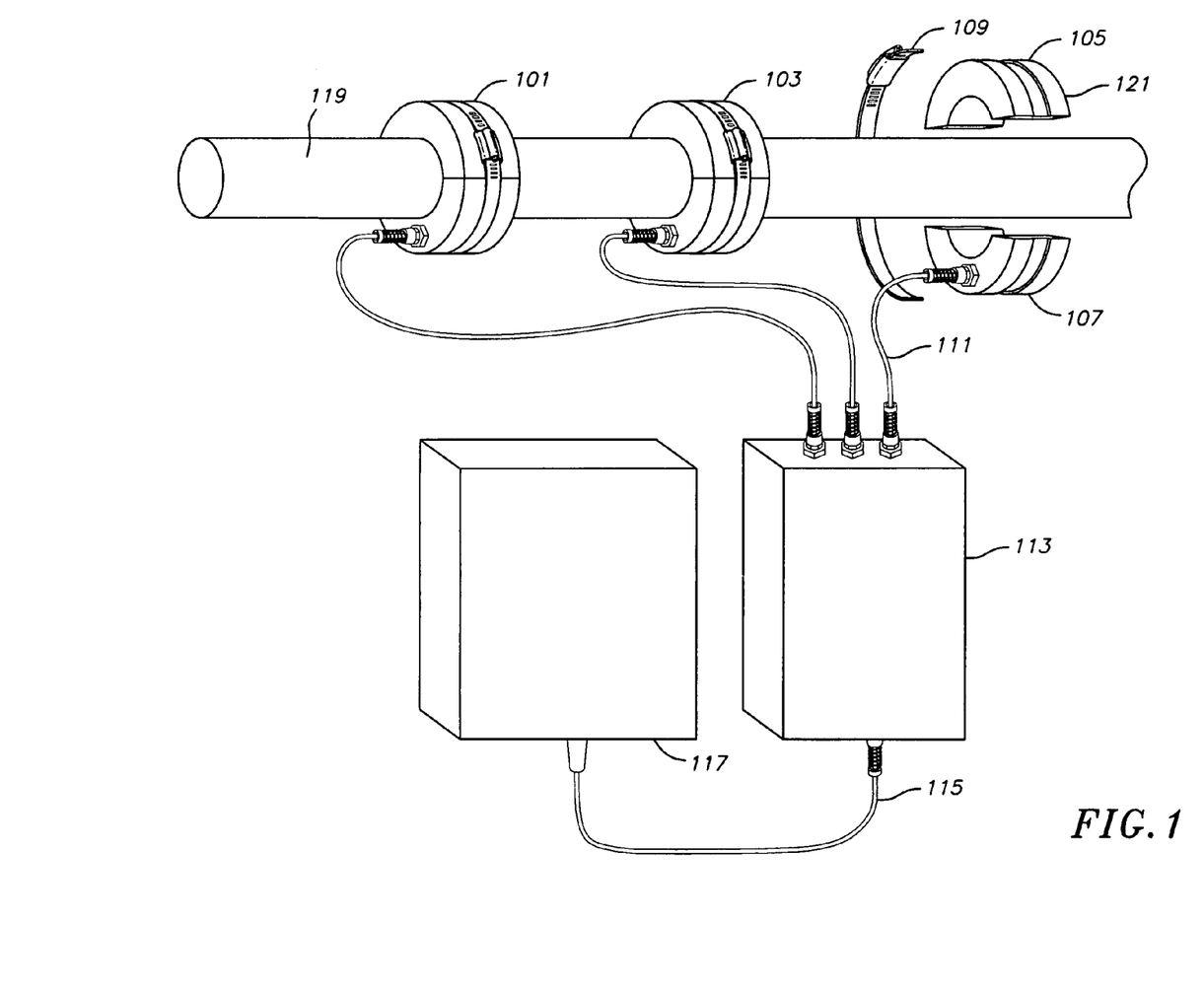
FIG. 1 is an illustration of one embodiment of the power supply.

FIG. 1 is a diagram of one embodiment of a current transformer power supply. In one embodiment, the components of the power supply may be primarily in a housing 113. The housing 113 may be connected by a set of wires to individual current transformers 101, 103 and 105. The power supply may have any number of current transformers connected to it. In one embodiment, three current transformers, one for each of the phases of a primary power line may be used. In general, each additional current transformer increases the amount of power that may be output for a given current through the primary power line. The primary power line may be any single phase power cable, set of power cables, wire, set of wires or similar materials for transporting electricity encased in an insulating and protective material. In one embodiment, the power line may be a high voltage line.

In one embodiment, the current transformers may have an annular shape. The inner diameter may match or exceed the outer diameter of a primary line to which it is designed to be attached. For example, a current transformer may have an inner diameter of 2.5 inches, a 6 inch outer diameter and a length of 3 inches. This example current transformer may be utilized for power lines having up to a 2.5 inch outer diameter. In another embodiment, the current transformer may have any shape, including a rectangular, polygonal, ovoid or similar shape with a hollow internal space to allow a power line to run through the middle of the shape.

In one embodiment, the current transformers may have a split core. The current transformers may have two or more primary components that fit together to make the shape of the current transformer. This allows the current transformer to be assembled and attached to the primary power line without disturbing the primary power line or interrupting service. The current transformer 105 may be two semi-circular structures 121, 107 or divided into similar pieces of the overall whole. The pieces may be attached to one another through any type of attachment mechanism including a snap fit, interlocking parts, clasps or similar mechanisms. In one embodiment, a band and clasp 109 may be wrapped around the pieces of the current transformer to hold them together after they are placed around the primary power line.

In one embodiment, the current transformers may be connected to the main housing 113 by a wire 111. The wire may be a conductive wire encased in an insulating and protective material. The wire may have any length or width. In one embodiment, the wire may be 15 feet in length. The length of the wire determines how far the main housing may be placed from the current transformers and primary power line. In one embodiment, the main housing and current transformer are portable and easily transported by an individual. The main housing and current transformers may have a small scale for convenience of storage and movement. In one embodiment, the main housing may be 10.25 inches by 6.25 inches by 3.5 inches and the current transformers may have a diameter of 6 inches.

In one embodiment, the main housing 113 contains the other components of the power supply. The main housing may be box shaped. In another embodiment, the main housing may have any shape. The main housing may be hermetically sealed to protect the internal components. The main housing may have a shape or attachment mechanisms to allow it to be mounted on a wall or similar position. The main housing may be designed to be mounted in an underground vault or pad mounted compartment. The main housing may be connected to an output wire and terminal 115. The output wire may have any length. The length of the output wire allows a battery or device drawing power from the power supply to be placed at a distance from the power supply or the current transformers. In one embodiment, the output wire may be 12 feet in length. The terminal on the output wire may be a standard direct current output terminal. In another embodiment, the output terminal may have any shape, size or configuration for coupling with the device for which the power supply provides power. In a further embodiment, the output wire may not have a terminal, but may be directly connected to the battery or device. In one embodiment, the main housing 113 may have multiple output wires or terminals. Each output wire or terminal may provide a different voltage, current or similar property of the electricity. In one embodiment, a first output may provide a standard direct current output while a second output may be controlled by a temperature control circuit.

In one embodiment, the power supply may provide power for a battery, monitoring device, switch or similar device. The device 117 may have a direct current input connector to receive the terminal from the power supply. A battery may supply power for a device. For example, devices that may be used include remote monitoring equipment to monitor the condition of the primary power lines or other items at the location, an automated switch for altering the configuration of the power distribution system, communication devices or similar devices and machinery that may require a low voltage input.

Figure 2:
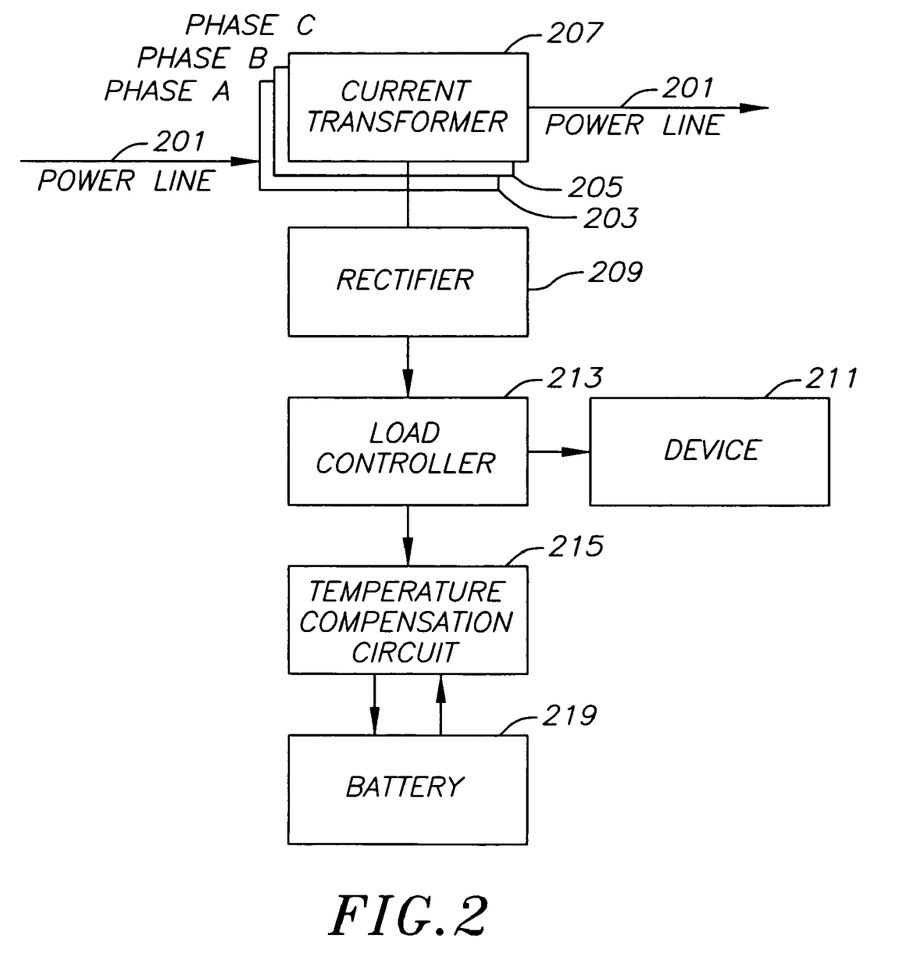
FIG. 2 is a diagram of one embodiment of the components of the power supply.

FIG. 2 is a diagram of one embodiment of the power supply system. In one embodiment, the system may have a set of current transformers 203, 205, 207 attached to or encircling a primary power line 201. The power line 201 may be a high voltage power line. In one embodiment, the primary power line 201 may be a 15 kilovolt, 25 or 35 kilovolt line. In another embodiment, any voltage may be present on the primary power line. The power line 201 may carry an alternating current. The current on the line may be between 0 and 600 amperes. In another embodiment, any amount of current may be present on the line.

In one embodiment, the power line 201 may run through the center of each current transformer. In one embodiment, the current transformers may be positioned to align with each phase of the alternating current on power line 201. Any number of current transformers may be present in the system. The number and configuration of the current transformers may be altered dependent on the desired output power and the characteristics of the primary power line 201. For example, three current transformers may be utilized corresponding with the three phases of the alternating current on power line 201. A first current transformer 203 may be positioned on phase A of the power line, a second 205 may be on phase B and a third 207 on phase C. Adding additional current transformers may increase the power output generated and may be necessary to generate a desired output voltage or current dependent on the power line 201 current level. In one embodiment, the output power may be between 0 and 65 watts. In another embodiment, any output power level may be generated.

In one embodiment, the current transformers 203, 205 and 207 may be split core transformers that are coupled together around the primary power supply. In another embodiment, a single core transformer may be utilized if alteration of the primary line is made or if installed at the time the primary line is installed or under similar circumstances. A split core allows for installation without disturbing the primary power line 201 including avoiding the need to modify the power line or interrupt service over the power line.

In one embodiment, the current transformers may have an iron core, iron-nickel ferromagnetic core or similar core material. Any material capable of functioning to induce current in combination with a winding based on the primary power line may be used. The core may be any size or dimension based on the desired characteristics of the output of the power supply. Larger cores may be utilized to generate higher voltages and current levels. In one embodiment, the core is wrapped with a copper winding or similar conductive material. The number, spacing and configuration of the windings may be determined based on the desired output current characteristics based on the primary power line characteristics. The current transformer may be center grounded or similarly grounded to maximize power and for safe handling. The winding material may continue through a wire or set of wires into the main housing of the power supply.

In one embodiment, the current transformers may be encased in a protective material. The protective material may be polyurethane, epoxy or similar material. The protective material may provide protection from environmental conditions to which the current transformer may be exposed. In one embodiment, the protective material may encase the current transformer to provide watertight protection. The wiring into the current transformer may be protected by similar materials. The wire may be encased in a stretchable structure to minimize potential damage to the wire during installation and usage.

In one embodiment, the wires from each of the current transformers may be input into a rectifier 209. In one embodiment, the rectifier may be a three phase rectifier. The rectifier combines the input from the current transformers and rectifies it to produce a direct current from the alternating current induced by the power line 201. The rectifier may output an unregulated direct current signal to the load controller. The load controller 213 may encompass a voltage regulator and current limiter that are configured to generate the desired output characteristics. For example, the voltage regulator may limit the output to 12 volts and the current regulator may limit the output to a 5.4 ampere output. In another embodiment, the load controller may be configured to output any voltage or current level. The design of the load controller may be altered to conform to the input voltage and current requirements of the device to be attached to the power supply. In one embodiment, the output of the load controller 213 may be output via a wire and terminal to an external device 211. In another embodiment, the power supply may be directly wired to the device or may be housed internal to the device.

In one embodiment, the external device 211 may be a remote terminal unit, remote switching device, communication device or similar mechanism. These devices may assist in the monitoring and control of the power distribution system. In another embodiment, the device 211 may have a function not directly related to the power distribution system such as a lighting fixture or similar device. The device may operate on a direct current with a low voltage and current level. This direct current input may not be available in the vicinity of underground power lines and pad mounted compartments.

In one embodiment, the output from the load controller may be supplied to a temperature compensation circuit 215. The device that receives the output from the power supply may have its power requirements affected by its operating condition or environmental conditions. For example, many types of rechargeable batteries are affected by their environment and have changing power input requirements over the range of their charging process. The temperature compensation circuit 215 may alter the voltage and current levels of the power output to the external device 219. In one embodiment, the temperature compensation circuit 215 may include a thermistor or similar device. The temperature compensation circuit may adjust the output characteristics based on internal sensor input or may receive feedback from the device 219 indicating its condition. The feedback may be used to adjust the voltage and current level of the output. The power supply may operate under temperatures ranging from −20 degrees Celsius to 65 degrees Celsius. All aspects of the power supply may be configured to be watertight to allow functioning under submerged or wet conditions.

Figure 3:
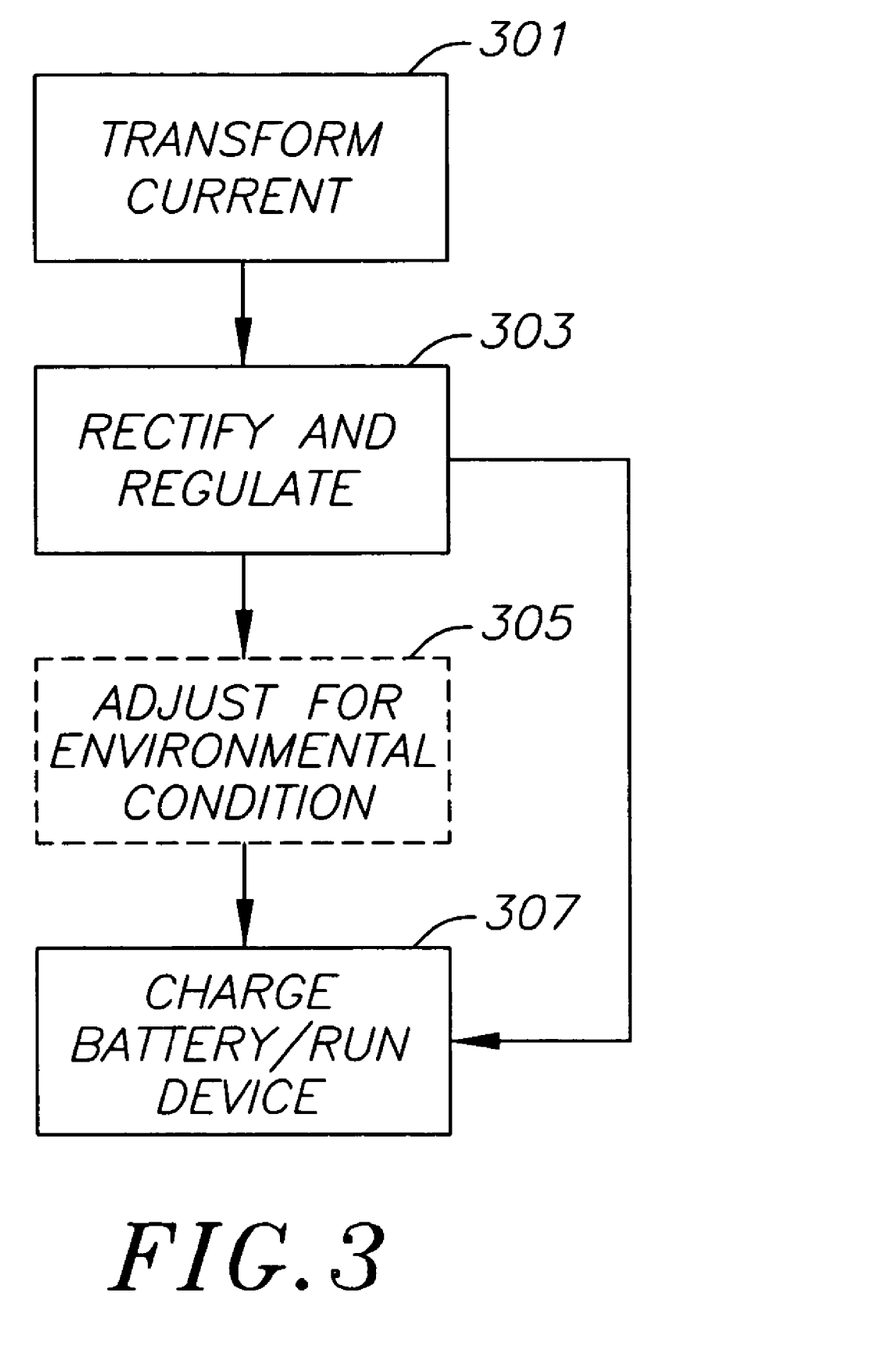
FIG. 3 is a flowchart of one embodiment of process for generating a low voltage direct current.

FIG. 3 is a diagram of one embodiment of a process for generating power for a device. In one embodiment, the output power may be derived from a high voltage power line or similar power line through a current transformer (block 301). A set of current transformers may generate a current on a secondary line in proportion to the current on the primary power line. The exact power proportion may be a design decision based on the primary power line characteristics and the requirements of the devices to be powered by the power supply.

In one embodiment, the output from the current transformers may be rectified to generate a direct current (block 303). The primary power line may carry an alternating current and induce an alternating current through the current transformers. The device utilizing the power supply may require a direct current. The rectifier may rectify multiple phases from multiple current transformers to generate an unregulated direct current output. In one embodiment, the output of the rectifier may then be regulated to generate a direct current output with a voltage and current level compatible with the device relying on the power supply. This regulated direct current output may be directly output to power the device (block 307).

In another embodiment, the regulated output may be further adjusted for environmental conditions or device conditions (block 305). The device receiving the output power may have requirements that change dependent on environmental conditions or the state of the device. The power supply may operate in extreme environments with large variations in ambient conditions including underground vaults with high voltage power lines and similar environments. A device such as a battery may have changing power requirements due to the environment and the level of its own stored charge. A temperature compensation circuit may alter the voltage and current levels of the output as needed by the device.

Figure 4:
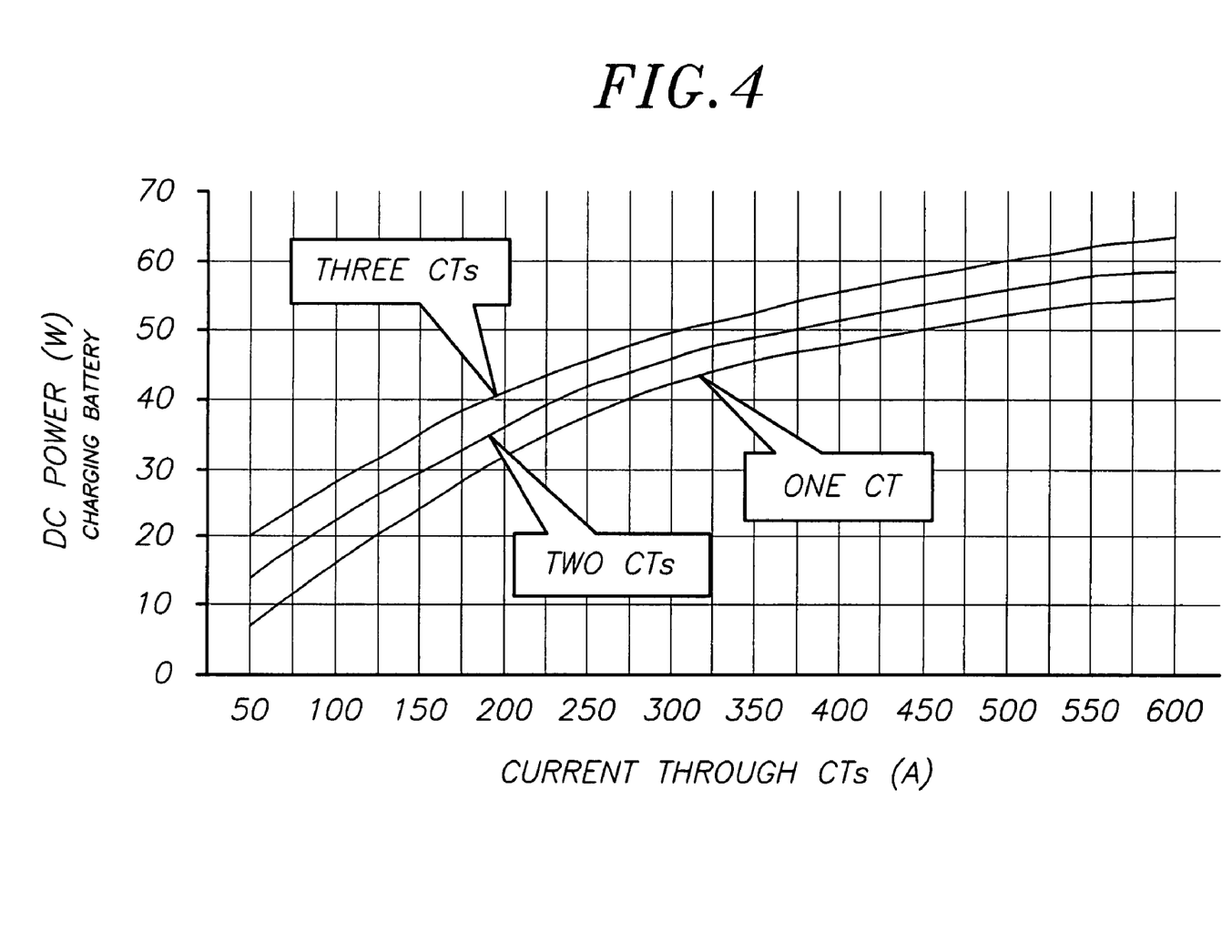
FIG. 4 is a chart of exemplary power production using one to three current transformers.

FIG. 4 is a chart showing the direct current power in watts for charging a battery over a range of currents on the primary power line for one, two and three current transformers. The addition of current transformers increases the direct current power for a given current level in the primary line. The chart demonstrates the range for one embodiment of the invention designed to provide a 12 volt output at 5.4 amperes. For this embodiment, a range of 10 to 65 watts of power may be produced dependent on the number of current transformers used and the current level in the primary power line as well as the configuration of the current transformers and power supply. In other embodiments, the power supply system may be configured to generate any level of voltage and current by altering the size and number of current transformers as well as the configuration of the load control circuit. The power output is proportionate to the current level through the primary power line.

Figure 5:
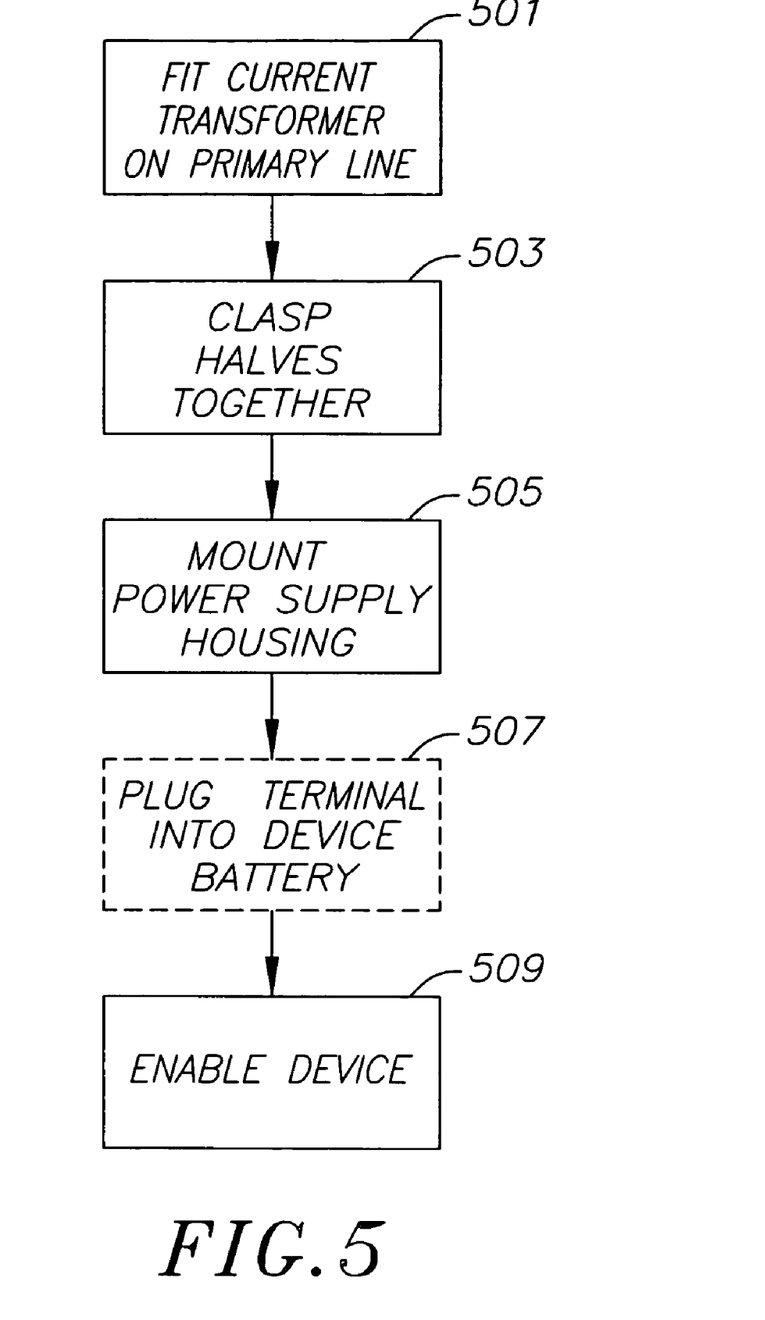
FIG. 5 is a flowchart of one embodiment of a process for installing the power supply.

FIG. 5 is a flowchart of one embodiment of a process for installing the power supply system. In one embodiment, the installer may identify the primary power line to be used and then fit the current transformers around the primary power line (block 501). Fitting the current transformers around the primary power line does not require that the power line be modified or taken out of service. The current transformers may be safely placed around the primary power line by a worker while it is in operation. Once the current transformer is in position the segments of the transformer may be attached or connected to one another (block 503). In one embodiment, the segments may be attached to one another using a band and clasp or similar coupling mechanism. The band may be placed around the outer surface of the current transformer, tightened and locked into place using a clasp or similar mechanism. In another embodiment, the pieces of the current transformer may be form fit, snap fit, interlocking or similarly attached to one another after being placed on the primary power line.

In one embodiment, the current transformers may be attached to the main housing of the power supply by a set of wires. In another embodiment, the current transformers maybe detachable from the main housing. Either end of the wire or both ends of the wire may use male-female terminals or similar coupling mechanisms to plug the wire into the current transformer or main housing. The coupling may create a water tight seal between the wire and the current transformer or main housing protecting the terminals from exposure to ambient conditions and water. The main housing may be mounted or placed in proximity to the current transformers (block 505). In one embodiment, the main housing may include adhesives on an outer surface, hooks, interlocking parts or similar mechanisms to attach the main housing to a surface or complementary structure. The main housing may be mounted in proximity to the current transformers, on a wall, shelf, or similar place. The main housing may be positioned in an underground vault or pad mounted compartment. The main housing may be placed to minimize exposure to water, extreme temperatures or similar phenomena.

In one embodiment, the main housing may have an output wire or output terminal to allow connection with a device to deliver power (block 507). The wire may be detachable at the main housing, at the device or both. In one embodiment, the main housing may be directly connected with or internal to the device. In another embodiment, the device such as a rechargeable battery may be internal or connected to the main housing. After the device is properly connected to the main housing the device may be enabled to draw power from the power supply (block 509).

In the foregoing specification, the invention has been described with reference to specific embodiments thereof. It will however, be evident that various modification and changes can be made thereto without departing from the broader spirit and scope of the invention as set forth in the appended claims. The specification and drawings are, accordingly, to be regarding in an illustrative rather than a restrictive sense.

What is claimed is:

1. A system comprising:
    a plurality of current transformers, each adapted to generate an alternating current on a corresponding one of a plurality of secondary lines based on a polyphase current in a primary line, wherein each of the plurality of current transformers is configured to transform a different phase of a primary line current;

a housing;

a polyphase rectifier circuit in the housing, the rectifier circuit in electrical communication with each of the plurality of current transformers, the rectifier circuit being adapted to rectify the alternating current on each of the plurality of secondary lines; and a load controller in the housing, the load controller in electrical communication with the rectifier circuit, the load controller to limit current and regulate voltage from the rectifier circuit, the load controller to output a direct current.

2. The system of claim 1, further comprising:
a rechargeable battery to receive the direct current.

3. The system of claim 2, further comprising:
a temperature compensation circuit to adjust the direct current based on one of an ambient condition and a battery condition.

4. The system of claim 1, wherein the system is autonomous from any power source other than the primary line.

5. The system of claim 1, wherein each of the plurality of current transformers is a split core transformer and attachable to the primary line without altering the primary line.

6. The system of claim 1, further comprising:
a remote terminal unit that operates on the direct current.

7. A method comprising:
inducing an alternating current on each of a plurality of secondary lines utilizing a corresponding one of a plurality of current transformers coupled to a polyphase primary line, wherein each of the plurality of current transformers is configured to transform a different phase of a primary line current;
rectifying the alternating current on each of the plurality of secondary lines; and
limiting current on each of the plurality of secondary lines to output a direct current at a constant voltage for at least one of charging a battery or operating a device.

8. The method of claim 7, further comprising:
regulating the voltage of the direct current.

9. The method of claim 7, further comprising:
attaching each of the plurality of current transformers to the primary line without altering the primary line.

10. The method of claim 7, further comprising:
altering the direct output based on one of ambient conditions and battery condition.

11. The method of claim 8, wherein regulating the voltage provides an approximately 12 volt direct current output.

12. The system of claim 1, wherein the housing comprises a hermetically sealed housing.

13. The method of claim 7, wherein the limiting current on each of the plurality of secondary lines to output a direct current at a constant voltage for at least one of charging a battery or operating a device comprises limiting current on each of the plurality of secondary lines to output a direct current at a constant voltage for operating a device, the device being autonomous from any power source other than the primary line and the plurality of secondary lines.

14. A system comprising:
a first current transformer configured to generate a first alternating current on a secondary line based on a current in a primary line, the primary line carrying a primary line current at a voltage of between about 15 kilovolts and 35 kilovolts;

a housing;

a rectifier circuit in the housing, the rectifier circuit in electrical communication with the first current transformer and configured to rectify the first alternating current on the secondary line;

a load controller in the housing, the load controller in electrical communication with the rectifier circuit, the load controller configured to limit current and regulate voltage from the rectifier circuit and output a direct current; and a device for monitoring or controlling the primary line or another device located near the system, the device receiving the direct current output of the load controller, wherein the system is autonomous from any power source other than the primary line, and when the primary line current is between about 50 and 600 amperes, the direct current output has a power that is between about 7 watts and 55 watts.

15. The system of claim 14, wherein the device is for monitoring or controlling the primary line or other lines.

16. The system of claim 1, wherein a voltage on the primary line is between about 15 kilovolts and 35 kilovolts, and when the primary line current is between about 50 amperes and 600 amperes, the direct current has a power that is between about 13 watts and 59 watts when two of the plurality of current transformers are in operation.

17. The system of claim 1, wherein a voltage on the primary line is between about 15 kilovolts and 35 kilovolts, and when the primary line current is between about 50 amperes and 600 amperes, the direct current has a power that is between about 20 watts and 64 watts when three of the plurality of current transformers are in operation.

18. The system of claim 16, wherein the direct output is about 12 volts.

19. The system of claim 17, wherein the direct output is about 12 volts.

20. The method of claim 7, wherein a voltage on the primary line is between about 15 kilovolts and 35 kilovolts, and when the primary line current is between about 50 amperes and 600 amperes, the direct current has a power that is between about 13 watts and 59 watts when two of the plurality of current transformers are in operation.

21. The method of claim 7, wherein a voltage on the primary line is between about 15 kilovolts and 35 kilovolts, and when the primary line current is between about 50 amperes and 600 amperes, the direct current has a power that is between about 20 watts and 64 watts when three of the plurality of current transformers are in operation.

22. The system of claim 1, wherein the housing is:
physically separated from the primary line and the plurality of current transformers, and
electrically connected to each of the plurality of current transformers via the corresponding one of the plurality of secondary lines.

23. The system of claim 14, further comprising a second current transformer adapted to generate a second alternating current on a second secondary line based on the primary line current, wherein:
the primary line current is a polyphase current;
each of the first current transformer and the second current transformer is configured to transform a different phase of the primary line current;
the rectifier circuit is:
a polyphase rectifier circuit,
in electrical communication with the second current transformer, and adapted to rectify the second alternating current on the second secondary line; and when the primary line current is between about 50 amperes and 600 amperes, the power of the direct current output is between about 13 watts and 59 watts when the first current transformer and the second current transformer are in operation.

24. The system of claim 23, further comprising a third current transformer adapted to generate a third alternating current on a third secondary line based on the primary line current, wherein:

the third current transformer is configured to transform a different phase of the primary line current than the first current transformer and the second current transformer;

the rectifier circuit is:

in electrical communication with the third current transformer, and adapted to rectify a third alternating current on the third secondary line; and when the primary line current is between about 50 amperes and 600 amperes, the power of the direct current output is between about 20 watts and 64 watts when the first current transformer, the second current transformer, and the third current transformer are in operation.

* * * * *